United States Patent
Kim et al.

(10) Patent No.: US 10,764,020 B2
(45) Date of Patent: Sep. 1, 2020

(54) UPLINK SIGNAL TRANSMISSION METHOD AND USER EQUIPMENT, AND UPLINK SIGNAL RECEPTION METHOD AND BASE STATION

(71) Applicant: LG ELECTRONICS INC., Seoul (KR)

(72) Inventors: Eunsun Kim, Seoul (KR); Hyunsoo Ko, Seoul (KR); Kijun Kim, Seoul (KR); Yunjung Yi, Seoul (KR); Hanbyul Seo, Seoul (KR); Suckchel Yang, Seoul (KR); Hojae Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/319,806

(22) PCT Filed: Jul. 26, 2017

(86) PCT No.: PCT/KR2017/008051
§ 371 (c)(1),
(2) Date: Jan. 22, 2019

(87) PCT Pub. No.: WO2018/021825
PCT Pub. Date: Feb. 1, 2018

(65) Prior Publication Data
US 2019/0342061 A1   Nov. 7, 2019

Related U.S. Application Data

(60) Provisional application No. 62/367,085, filed on Jul. 26, 2016.

(51) Int. Cl.
*H04L 5/10* (2006.01)
*H04L 5/00* (2006.01)
(Continued)

(52) U.S. Cl.
CPC .............. *H04L 5/10* (2013.01); *H04L 5/0051* (2013.01); *H04W 52/36* (2013.01);
(Continued)

(58) Field of Classification Search
None
See application file for complete search history.

(56) References Cited

U.S. PATENT DOCUMENTS

| | | | |
|---|---|---|---|
| 2010/0080112 A1* | 4/2010 | Bertrand | H04L 27/2657 370/208 |
| 2011/0124357 A1* | 5/2011 | Kim | H04L 1/0003 455/507 |

(Continued)

FOREIGN PATENT DOCUMENTS

WO    2016013744    1/2016

OTHER PUBLICATIONS

PCT International Application No. PCT/KR2017/008051, Written Opinion of the International Searching Authority dated Nov. 6, 2017, 19 pages.

(Continued)

*Primary Examiner* — Robert C Scheibel
*Assistant Examiner* — Gautam Sharma
(74) *Attorney, Agent, or Firm* — Lee Hong Degerman Kang Waimey

(57) ABSTRACT

A user equipment (UE) receives UE group information indicating a first UE group to which the UE belongs, and transmits uplink (UL) data and a demodulation reference signal (DM-RS), which is for demodulating the UL data, on the basis of the UE group information. The DM-RS is transmitted by means of a first uplink demodulation reference signal (UL DM-RS) resource, which corresponds to the
(Continued)

first UE group to which the UE belongs, among a plurality of UL DM-RS resources respectively corresponding to one or more UE groups.

7 Claims, 9 Drawing Sheets

(51) Int. Cl.
  *H04W 52/36* (2009.01)
  *H04W 72/04* (2009.01)
  *H04W 72/14* (2009.01)
(52) U.S. Cl.
  CPC ... *H04W 72/0446* (2013.01); *H04W 72/0473* (2013.01); *H04W 72/14* (2013.01)

(56) References Cited

U.S. PATENT DOCUMENTS

| | | | | |
|---|---|---|---|---|
| 2011/0243262 A1* | 10/2011 | Ratasuk | ................ | H04L 5/003 375/260 |
| 2012/0270591 A1* | 10/2012 | Sun | ................ | H04L 5/0035 455/522 |
| 2013/0114547 A1* | 5/2013 | Li | ................ | H04L 5/0051 370/329 |
| 2013/0155992 A1* | 6/2013 | Yoon | ................ | H04L 5/0023 370/329 |
| 2014/0169324 A1* | 6/2014 | Seo | ................ | H04L 5/001 370/329 |
| 2014/0211713 A1* | 7/2014 | Ito | ................ | H04L 5/0048 370/329 |
| 2014/0254544 A1* | 9/2014 | Kar Kin Au | ........ | H04L 1/0038 370/330 |
| 2014/0269492 A1 | 9/2014 | Forenza et al. | | |
| 2014/0301238 A1 | 10/2014 | Chun et al. | | |
| 2015/0036525 A1* | 2/2015 | Aiba | ................ | H04B 1/7103 370/252 |
| 2015/0038089 A1* | 2/2015 | Brunel | ................ | H04W 24/02 455/63.2 |
| 2015/0304911 A1 | 10/2015 | Wang et al. | | |
| 2016/0112994 A1* | 4/2016 | Wang | ................ | H04L 5/0048 370/329 |
| 2017/0094657 A1* | 3/2017 | Yoon | ................ | H04L 5/0012 |
| 2017/0273128 A1* | 9/2017 | Abedini | ................ | H04J 13/0062 |

OTHER PUBLICATIONS

Samsung, "Non-Orthogonal Multiple Access Considerations for NR", 3GPP TSG RAN WG1 Meeting #85, R1-163993, May 2016, 4 pages.

* cited by examiner

UPLINK SIGNAL TRANSMISSION METHOD AND USER EQUIPMENT, AND UPLINK SIGNAL RECEPTION METHOD AND BASE STATION

CROSS-REFERENCE TO RELATED APPLICATIONS

This application is the National Stage filing under 35 U.S.C. 371 of International Application No. PCT/KR2017/008051, filed on Jul. 26, 2017, which claims the benefit of U.S. Provisional Application No. 62/367,085, filed on Jul. 26, 2016, the contents of which are all hereby incorporated by reference herein in their entirety.

TECHNICAL FIELD

The present invention relates to a wireless communication system, and more particularly, to a method and apparatus for transmitting/receiving uplink signals.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at any time and anywhere by connecting a plurality of devices and objects to each other is one main issue to be considered in next generation communication.

Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies using high frequency bands.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of transmitting an uplink (UL) signal by a user equipment (UE) in a wireless communication system. The method includes: receiving UE group information indicating a first UE group to which the UE belongs; and transmitting UL data and a demodulation reference signal (DM-RS) for demodulating the UL data based on the UE group information. The DM-RS is transmitted using a first UL DM-RS resource corresponding to the first UE group to which the UE belongs among a plurality of UL DM-RS resources corresponding respectively to one or more UE groups.

According to another aspect of the present invention, provided herein is a user equipment (UE) for transmitting an uplink (UL) signal in a wireless communication system. The UE includes a radio frequency (RF) unit, and a processor configured to control the RF unit. The processor is configured to: control the RF unit to receive UE group information indicating a first UE group to which the UE belongs; and control the RF unit to transmit UL data and a demodulation reference signal (DM-RS) for demodulating the UL data based on the UE group information. The processor is configured to control the RF unit to transmit the DM-RS using a first UL DM-RS resource corresponding to the first UE group to which the UE belongs among a plurality of UL DM-RS resources corresponding respectively to one or more UE groups According to another aspect of the present invention, provided herein are a method and a base station (BS) for receiving an uplink (UL) signal from a user equipment (UE) in a wireless communication system. The BS transmits UE group information indicating a first UE group to which the UE belongs; and receives UL data and a demodulation reference signal (DM-RS) for demodulating the UL data based on the UE group information. The DM-RS is received using a first UL DM-RS resource corresponding to the first UE group to which the UE belongs among a plurality of UL DM-RS resources corresponding respectively to one or more UE groups.

According to another aspect of the present invention, provided herein are a method and a base station (BS) for receiving an uplink (UL) signal from a user equipment (UE) in a wireless communication system. The BS receives channel state information from UEs; groups the UEs into a plurality of UE groups based on the channel state information; and transmits UL demodulation reference signal (DM-RS) information about a plurality of UL DM-RS resources for the plural UE groups. Each of the plural UL DM-RS resources corresponds to one or more UE groups among the plural UE groups.

In each aspect of the present invention, sharing resource information indicating a time-frequency resource in which the UE is capable of attempting to perform UL access may be provided to the UE. The UL data and the DM-RS may be transmitted within the time-frequency resource.

In each aspect of the present invention, the plural UL DM-RS resources may be distinguished by different time symbols within a slot.

In each aspect of the present invention, the UL data may be transmitted with a transmission power value determined based on a first power offset corresponding to the first UE group to which the UE belongs among a plurality of power offsets corresponding respectively to one or more UE groups.

The above technical solutions are merely some parts of the examples of the present invention and various examples into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to an example of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate examples of the invention and together with the description serve to explain the principle of the invention.

MODE FOR THE INVENTION

Figure 1:
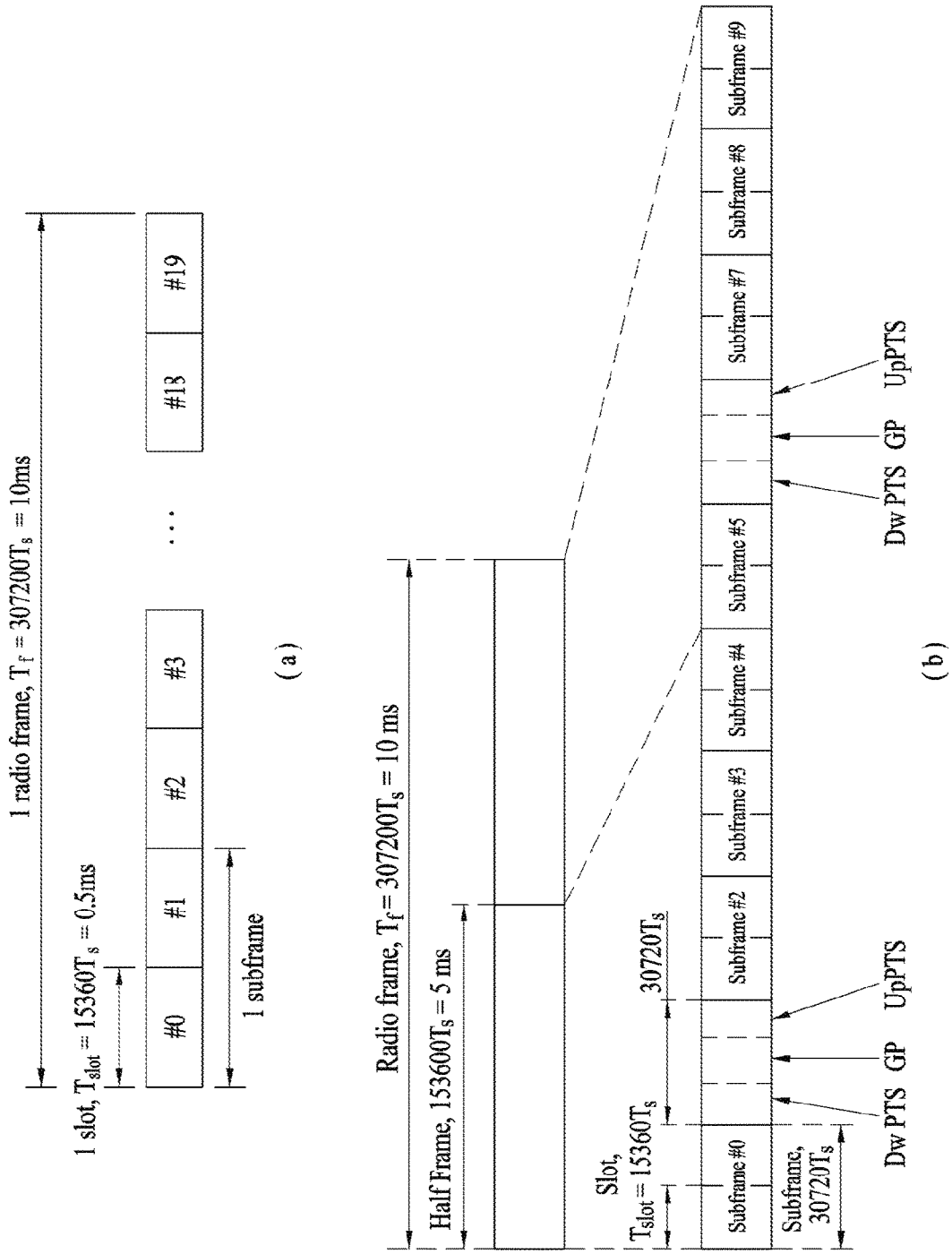
FIG. 1 illustrates the structure of a radio frame used in the LTE/LTE-A based wireless communication system.

Reference will now be made in detail to the exemplary examples of the present invention, examples of which are illustrated in the accompanying drawings. The detailed description, which will be given below with reference to the accompanying drawings, is intended to explain exemplary examples of the present invention, rather than to show the only examples that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In examples of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms ($307,200 T_s$) in duration. The radio frame is divided into 10 subframes of equal size. Subframe numbers may be assigned to the 10 subframes within one radio frame, respectively. Here, E denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
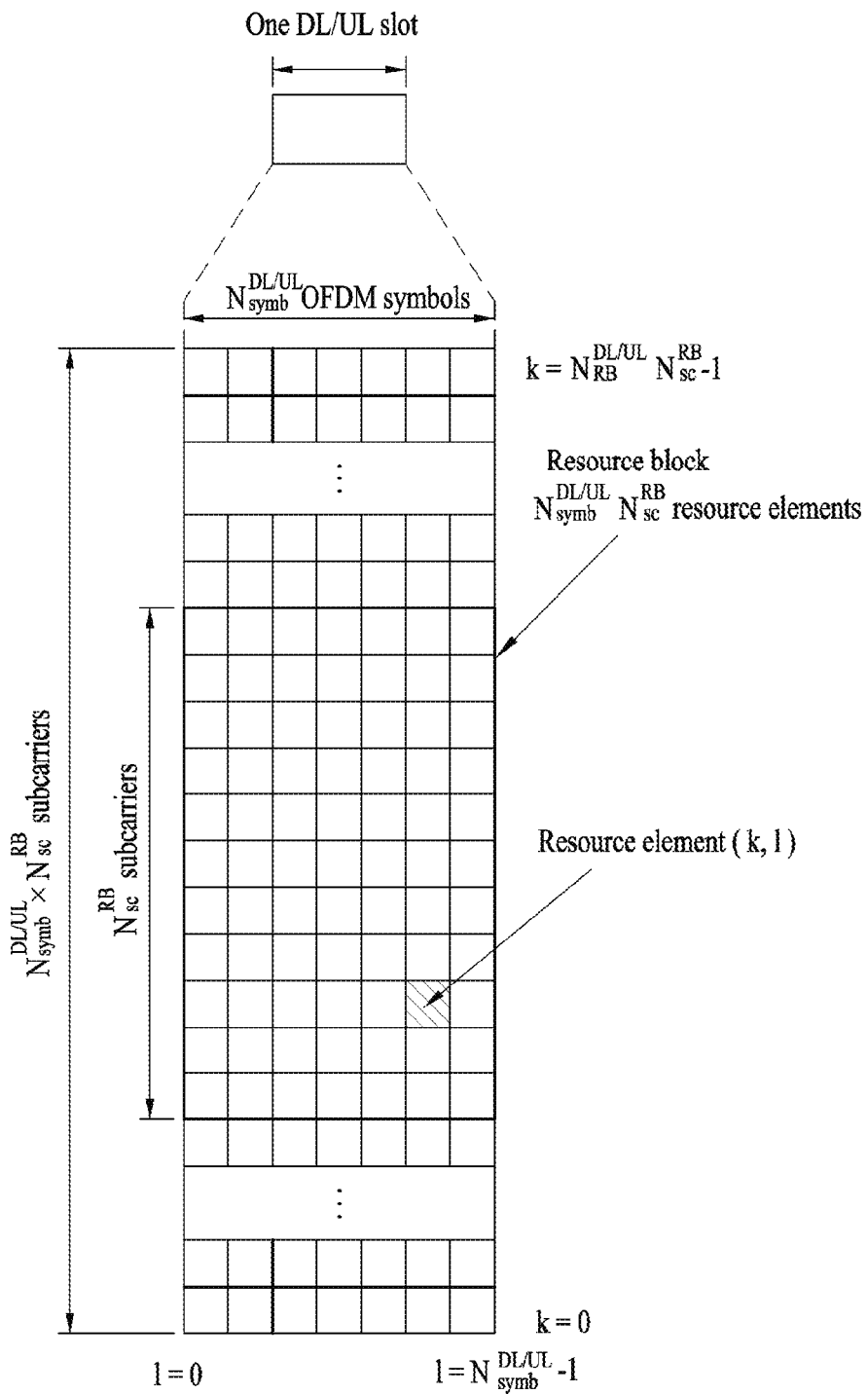
FIG. 2 illustrates the structure of a downlink (DL)/uplink (UL) slot in the LTE/LTE-A based wireless communication system.

FIG. 2 illustrates the structure of a DL/UL slot structure in the LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{DL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, examples of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

Figure 3:
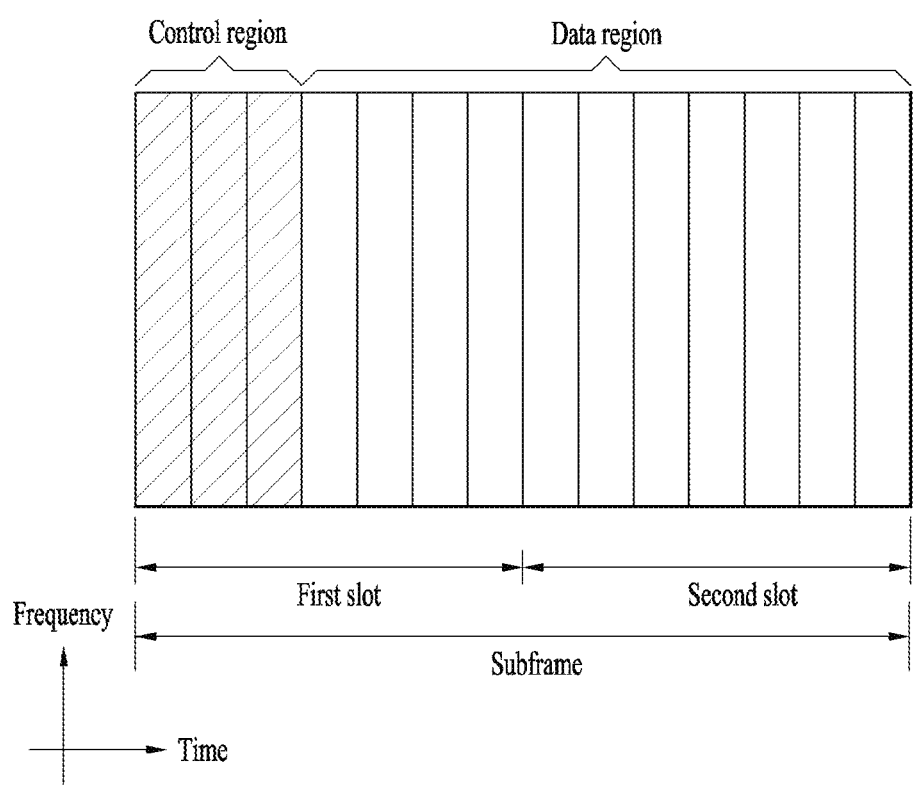
FIG. 3 illustrates the structure of a DL subframe used in the LTE/LTE-A based wireless communication system.

FIG. 3 illustrates the structure of a DL subframe used in the LTE/LTE-A based wireless communication system.

Referring to FIG. 3, a DL subframe is divided into a control region and a data region in the time domain Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE contains 9 REGs, which are distributed across the first 1/2/3 (/4 if needed for a 1.4 MHz channel) OFDM symbols and the system bandwidth through interleaving to enable diversity and to mitigate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is NREG, the number of available CCEs in a DL subframe for PDCCH(s) in a system is numbered from 0 to NccE−1, where NccE=floor(NREG/9). A PDCCH including n consecutive CCEs may be transmitted only on CCEs fulfilling "i mod n=0" wherein i is a CCE number.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. The set of PDCCH candidates that the UE is to monitor is defined in terms of SSs, where a search space $S^{(L)}_k$ at aggregation level $L \in \{1,2,4,8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

Figure 4:
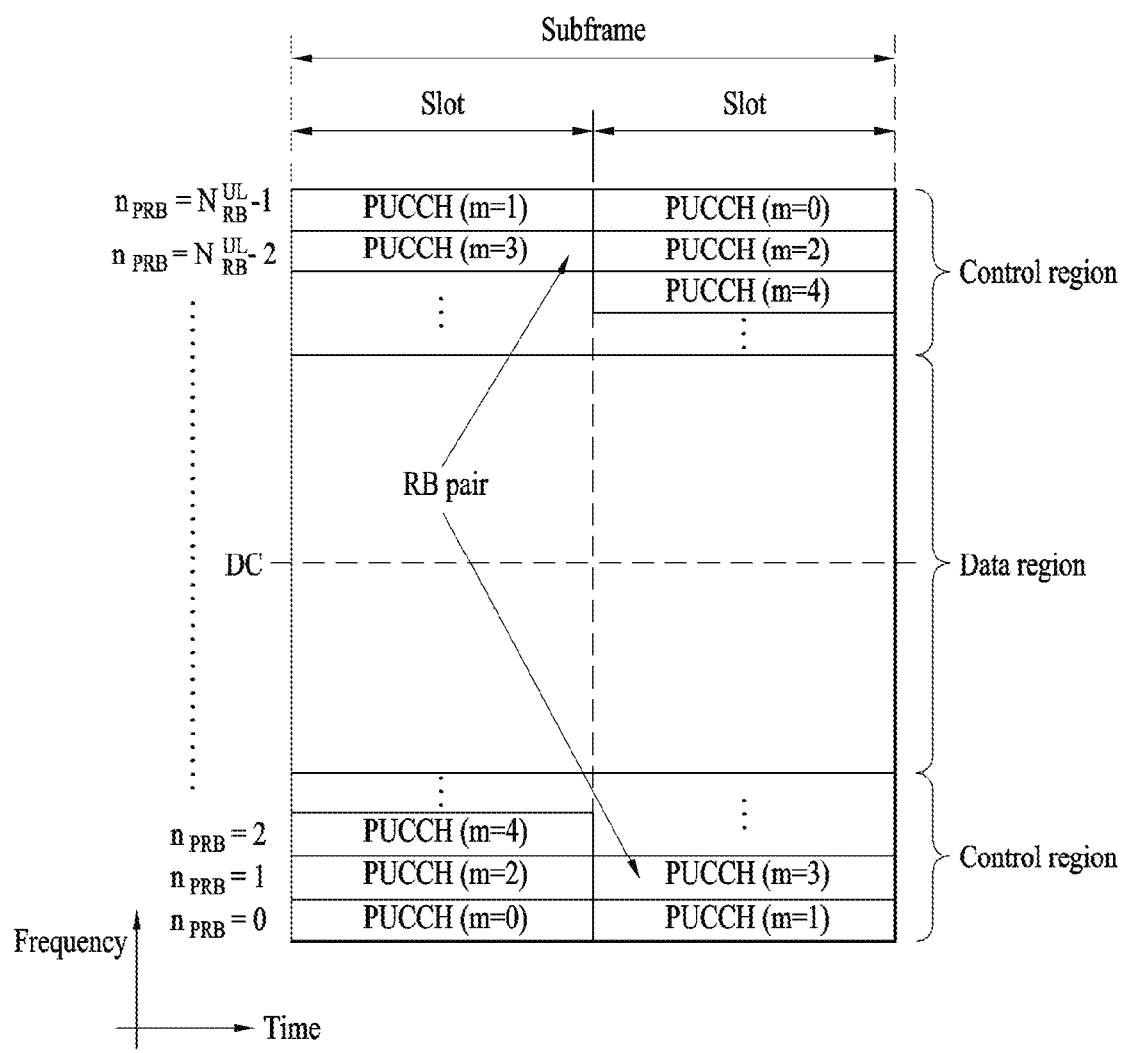
FIG. 4 illustrates the structure of a UL subframe used in the LTE/LTE-A based wireless communication system.

FIG. 4 illustrates the structure of a UL subframe used in the LTE/LTE-A based wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

For PUSCH demodulation, a PUSCH DM-RS may be transmitted in a PUSCH region and, for PUCCH demodulation, a PUCCH DM-RS may be transmitted in a PUCCH region. Meanwhile, a sounding reference signal (SRS) may be allocated to the PUSCH region. The SRS is a UL RS which is not associated with PUSCH or PUCCH transmission. The SRS is transmitted in an OFDM symbol which is located at the last part of a UL subframe in the time domain and in a data transmission band of the UL subframe, that is, in the PUSCH region, in the frequency domain. The eNB may measure a UL channel state between the UE and the eNB using the SRS. SRSs of multiple UEs transmitted/received in the last OFDM symbol of the same subframe may be distinguished according to frequency position/sequence. Since the PUCCH DM-RS, the PUSCH DM-RS, and the SRS are UE-specifically generated by a specific UE and are transmitted to the eNB, these signals may be regarded as UL UE-specific RSs (hereinafter, UL UE-RSs). A UL UE-RS is defined by a cyclic shift a of a base sequence $r_{u,v}(n)$ according to a predetermined rule. For the PUCCH DM-RS, the PUSCH DM-RS, and the SRS, a plurality of base sequences are defined. For example, the base sequences may be defined using a root Zadoff-Chu sequence. The base sequences $r_{u,v}(n)$ are divided into a plurality of base sequence groups. Each base sequence group includes one or more base sequences. Among the plural base sequences, a base sequence for the UL UE-RS is determined based on a cell identifier, an index of a slot to which the UL UE-RS is mapped, and the like. The cell identifier may be a physical layer cell identifier acquired by the UE from a synchronization signal or a virtual cell identifier provided by a higher layer signal. A cyclic shift value used for cyclic shift of the base sequence is determined based on the cell identifier, a cyclic shift related value given by DCI and/or higher layers, an index of a slot to which the UL UE-RS is mapped, and the like.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

The examples of the present invention can be applied to not only the 3GPP LTE/LTE-A system but also a new radio access technology (RAT) system. As a number of communication devices have required much higher communication capacity, the necessity of mobile broadband communication, which is much enhanced compared to the conventional RAT, has increased. In addition, massive MTC capable of providing various services anytime and anywhere by connecting a number of devices or things to each other has been considered as a main issue in the next generation communication system. Moreover, the design of a communication system capable of supporting services/UEs sensitive to reliability and latency has also been discussed. That is, the introduction of the next generation RAT considering the enhanced mobile broadband communication, massive MTC, Ultra-reliable and low latency communication (URLLC), etc. has been discussed. For convenience of description, the corresponding technology is simply referred to as a new RAT in this specification.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Figure 5:
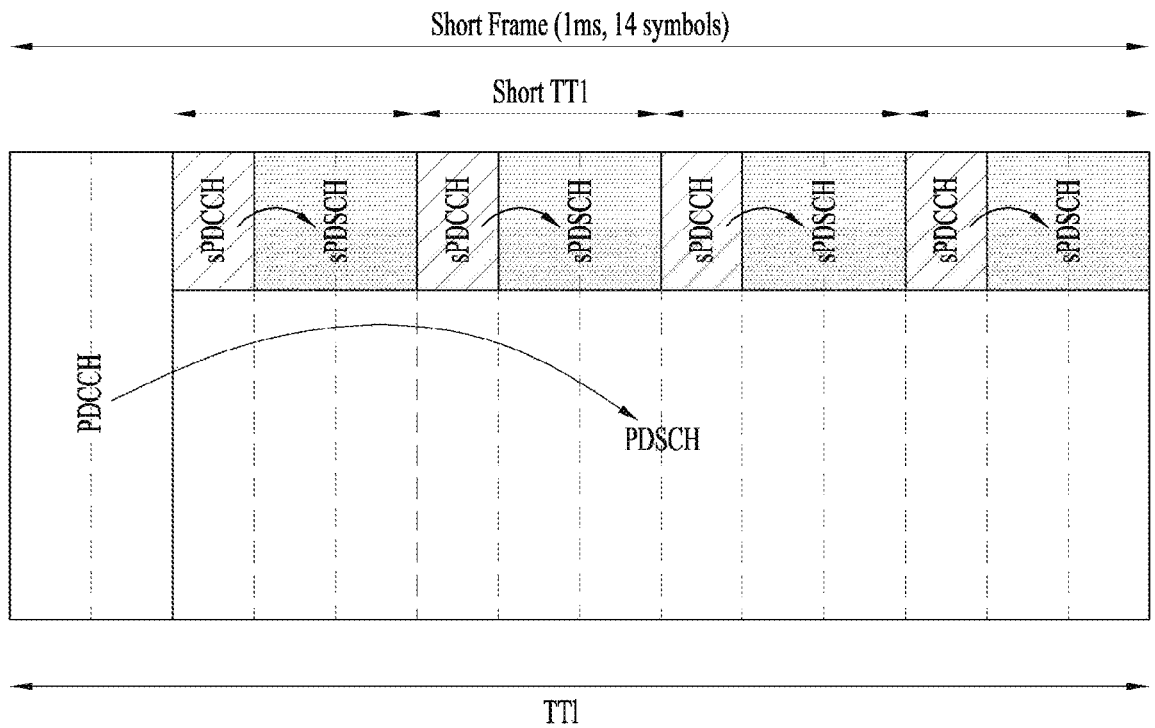
FIG. 5 illustrates an example of a short TTI and a transmission example of a control channel and a data channel in the short TTI.

FIG. 5 illustrates an example of a short TTI and a transmission example of a control channel and a data channel in the short TTI.

To reduce a user plane (U-plane) latency to 1 ms, a shortened TTI (sTTI) shorter than 1 ms may be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. The method of transmitting/receiving a signal in a TTI and an sTTI according to examples described below is applicable not only to the system according to the current LTE/LTE-A numerology but also to the default/main TTI and sTTI of the system according to the numerology for the new RAT environment.

In the downlink environment, a PDCCH for transmission/ scheduling of data within an sTTI (i.e., sPDCCH) and a PDSCH transmitted within an sTTI (i.e., sPDSCH) may be transmitted. For example, referring to FIG. 5, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an OFDM manner, using different regions of PRB(s)/frequency resources.

In a new RAT (NR) system, a time unit in which a data channel may be scheduled may be referred to as other terms, for example, a slot, instead of a subframe. The number of slots in a radio frame of the same time length may differ according to a time length of a slot. In the present invention, the terms "subframe", "TTI", and "slot" are interchangeably used to indicate a basic time unit of scheduling.

<OFDM Numerology>

The new RAT system uses an OFDM transmission scheme or a similar transmission scheme. For example, the new RAT system may follow the OFDM parameters defined in the following table. Or although the new RAT system still uses the legacy LTE/LTE-A numerology, the new RAT system may have a wider system bandwidth (e.g., 100 MHz). Or one cell may support a plurality of numerologies. That is, UEs operating with different numerologies may co-exist within one cell.

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of $0.5\lambda$ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

<Subframe Structure>

Figure 6:
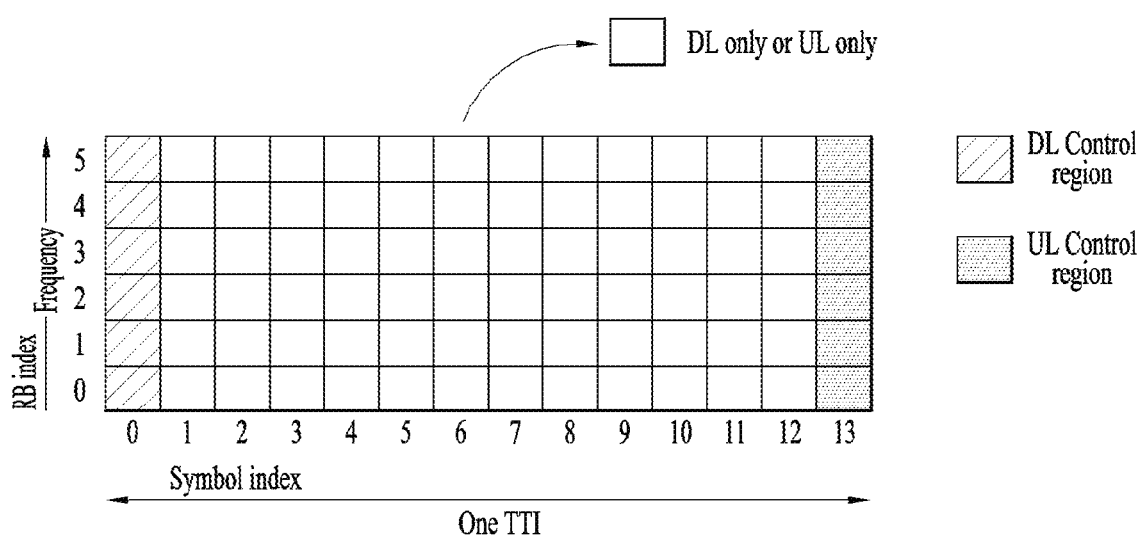
FIG. 6 illustrates a subframe structure.

FIG. 6 illustrates a new RAT (NR) subframe structure.

To minimize a data transmission delay, a subframe structure in which a control channel and a data channel are multiplexed in time division multiplexing (TDM) is considered in 5G new RAT.

In FIG. 6, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 6, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the self-contained subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a self-contained subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the self-contained subframe structure are set as a guard period (GP).

In a legacy LTE/LTE-A system, a DL control channel is TDMed with a data channel (refer to FIG. 3) and a PDCCH, which is a control channel, is transmitted throughout an entire system band. However, in new RAT, it is expected that a bandwidth of one system reaches approximately a minimum of 100 MHz. Therefore, it is difficult to distribute the control channel throughout the entire band for transmission of the control channel. For data transmission/reception of the UE, if the entire band is monitored to receive the DL control channel, this may cause increase in battery consumption of the UE and deterioration of efficiency. Accordingly, the present invention proposes a scheme in which the DL control channel can be locally transmitted or distributively transmitted in a partial frequency band in a system band, i.e., a channel band.

Figure 7:
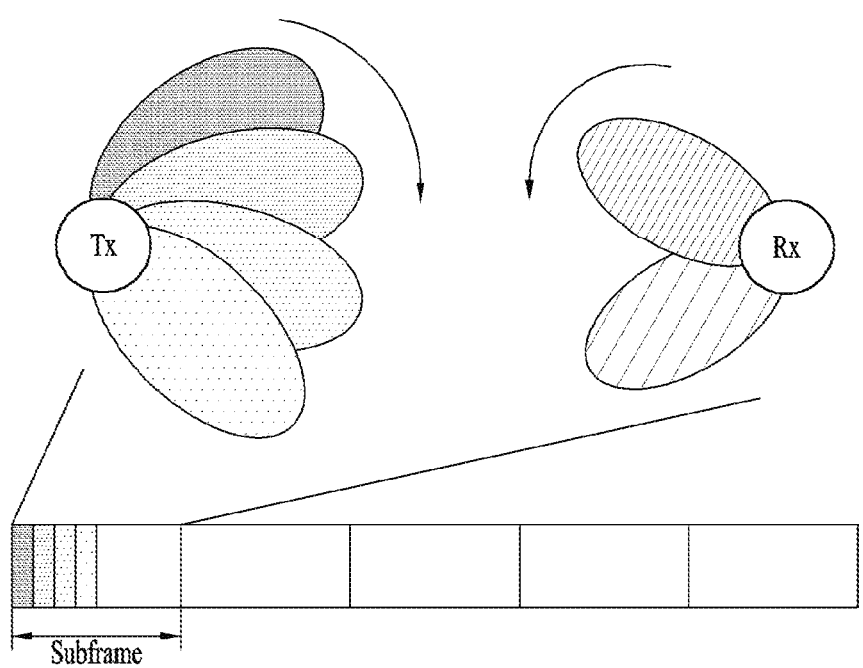
FIG. 7 illustrates an application example of analog beamforming.

FIG. 7 illustrates a transmission/reception method of a radio signal using an analog beam. Particularly, FIG. 7 illustrates a transmission/reception method of a radio signal by transmission/reception analog beam scanning.

Referring to FIG. 7, if an eNB transmits a synchronization signal in a cell or a carrier while switching beams, a UE performs synchronization with the cell/carrier using the synchronization signal detected in the cell/carrier and discovers a most suitable (beam) direction for the UE. The UE should be capable of acquiring a cell ID and a beam ID (corresponding to the beam direction) by performing this procedure. The UE may acquire signals, particularly, RS information, transmitted in the beam direction, for example, an RS sequence, seed information, and location, while acquiring the beam ID. The eNB may allocate a group ID to UEs that have acquired a specific beam ID, i.e., UEs capable of receiving a DL channel in a specific beam direction. Cell-common information may be temporally/spatially divided on a beam ID basis and then transmitted to the UE. The cell-common information may be transmitted to the UE by a beam ID common scheme.

Upon acquiring the beam ID in a cell, the UE may receive cell-specific information as beam ID or group ID specific information. The beam ID or group ID specific information may be information that UEs of a corresponding group commonly receive.

<Density Control Non-Orthogonal Code Multiple Access (DC-NCMA)>

Increase in a demand for mobile Internet and Internet of things imposes strict requirements on 5G wireless communication, such as high spectral efficiency and massive connectivity. Recently, non-orthogonal multiple access (NOMA) combined with the concept of superposition coding in a transmitting device and successive interference cancellation (SIC) in a receiving device has been presented as promising multiple access technology for 5G wireless technology. Unlike legacy multiple access technology, NOMA may accommodate much more users through resource allocation.

To support massive connectivity, a multiple access scheme capable of performing demodulation while supporting the maximum number or more of sequence-based reference symbols, for example, the maximum number or more of UEs distinguishable by orthogonal sequences (within the same time symbol), is needed.

Figure 8:
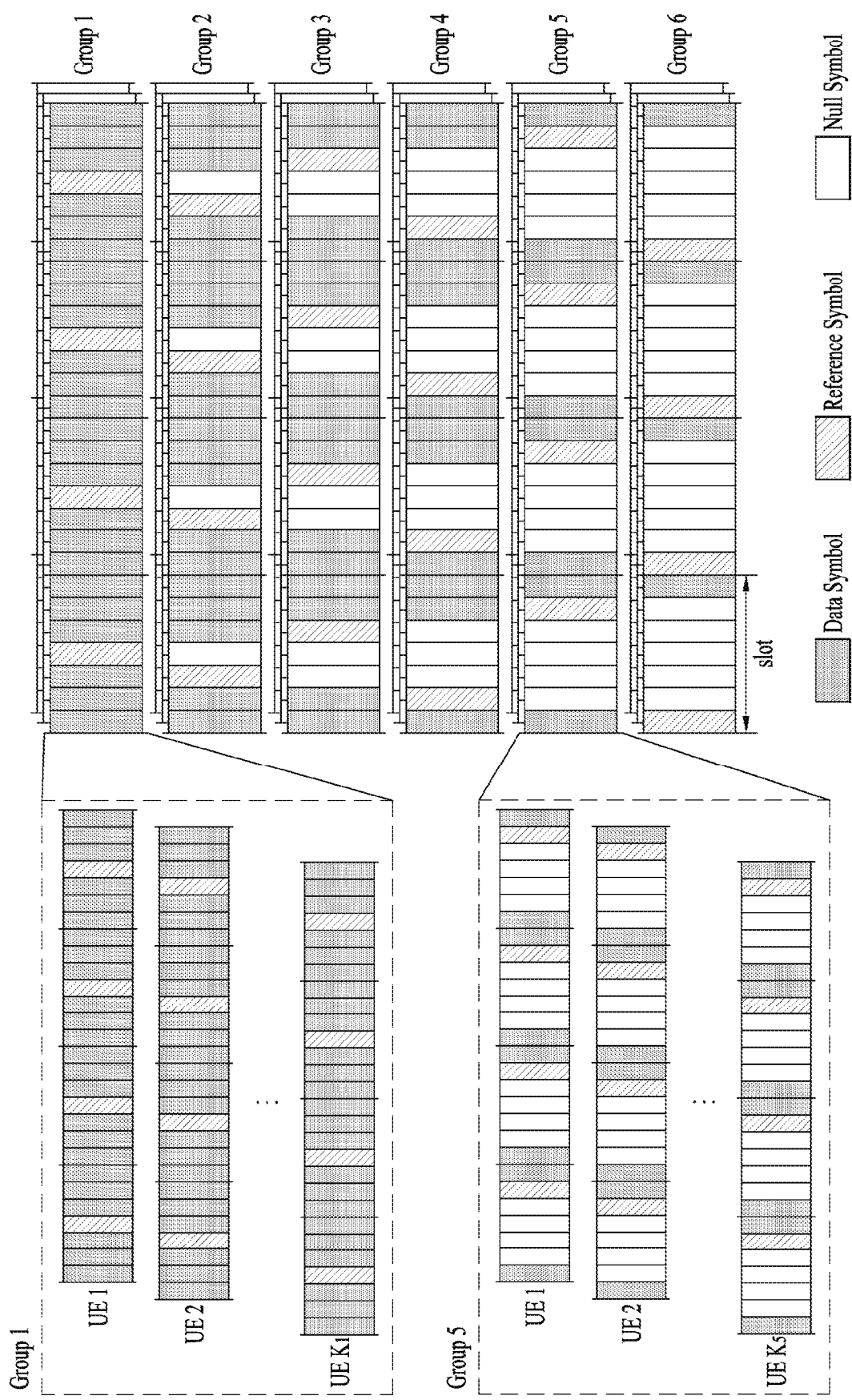
FIG. 8 illustrates a frame structure of NOMA groups based on reference signal (RS) hopping.

FIG. 8 illustrates a frame structure of NOMA groups based on RS hopping. Particularly, FIG. 8 illustrates a frame structure of NOMA user groups sharing one frequency resource.

To support the maximum number or more of reference symbols, all reference symbols of a maximum number are used in each group and reference symbols of each group are avoidably configured not to overlap with reference symbols of other groups as illustrated in FIG. 8. As an example, in 3GPP LTE, up to 6 user groups are supported in a normal CP frame structure illustrated in FIG. 8 and up to 5 user groups are supported in an extended CP frame structure. As the number of groups using the same reference symbol, i.e., the number of overlapping groups within the same reference symbol, increases or as the maximum number of user groups increases, the receiving device has difficulty in demodulating signals. Accordingly, the number of groups used may differ according to system environment or quality of service (QoS) constraint. The maximum number of users supportable in one group is equal to the maximum number of sequence-based RSs. Since it is difficult to demodulate signals as the number of users performing NOMA within one group increases, the number of users within the same group may vary with system environment or QoS constraint.

Figure 9:
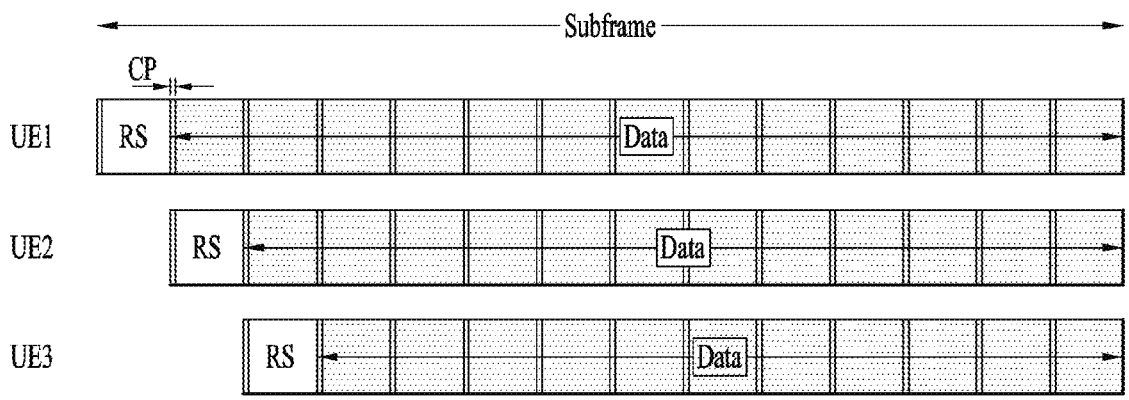
FIG. 9 is a diagram for explaining DC-NCMA.

As a modification of NOMA, DC-NCMA may be considered. FIG. 9 is a diagram for explaining DC-NCMA.

UE1 to UE3 illustrated in FIG. 9 may also represent user group 1 to user group 3. An eNB may receive an RS of UE1 (or user group 1) without interference. The eNB performs channel estimation based on the RS and decodes data. The eNB performs detection (or decoding), while removing the decoded data of UE1 (or user group 1), from an RS of UE2 (or user group 2), using a known sequence based on the decoded data of UE1 (or user group 1). In the same way, the eNB decodes data of UE2 (or user group 2) based on the decoded data of UE1 (or user group 1) and on channel estimation through the RS of UE2 (or user group 2). Likewise, the eNB may perform iterative detection for all UE classes or user groups.

Introduction of next-generation radio access technology (hereinafter, NR) is under discussion in consideration of eMBB, mMTC, URLLC, and the like, as described above. The eMBB service should support higher spectral efficiency and high transmission rate. mMTC should support wide coverage and high energy efficiency while supporting services for the larger number of UEs. URLLC should support very reliable low error rate and requires low latency. Requirements of data rate of URLLC are wide in range from low data rate to very high data rate.

In a next-generation 5G system, various methods have been proposed to raise data rate, improve connectivity, or reduce latency and, particularly, a multiple access scheme capable of satisfying such requirements is needed.

The present invention proposes a multiple access method of raising connectivity or data rate by non-orthogonally multiplexing a plurality of UEs within a given resource. In particular, the present invention proposes a UE grouping method of a NOMA scheme and RS position differentiation and transmission power differentiation methods for each UE group.

Figure 10:
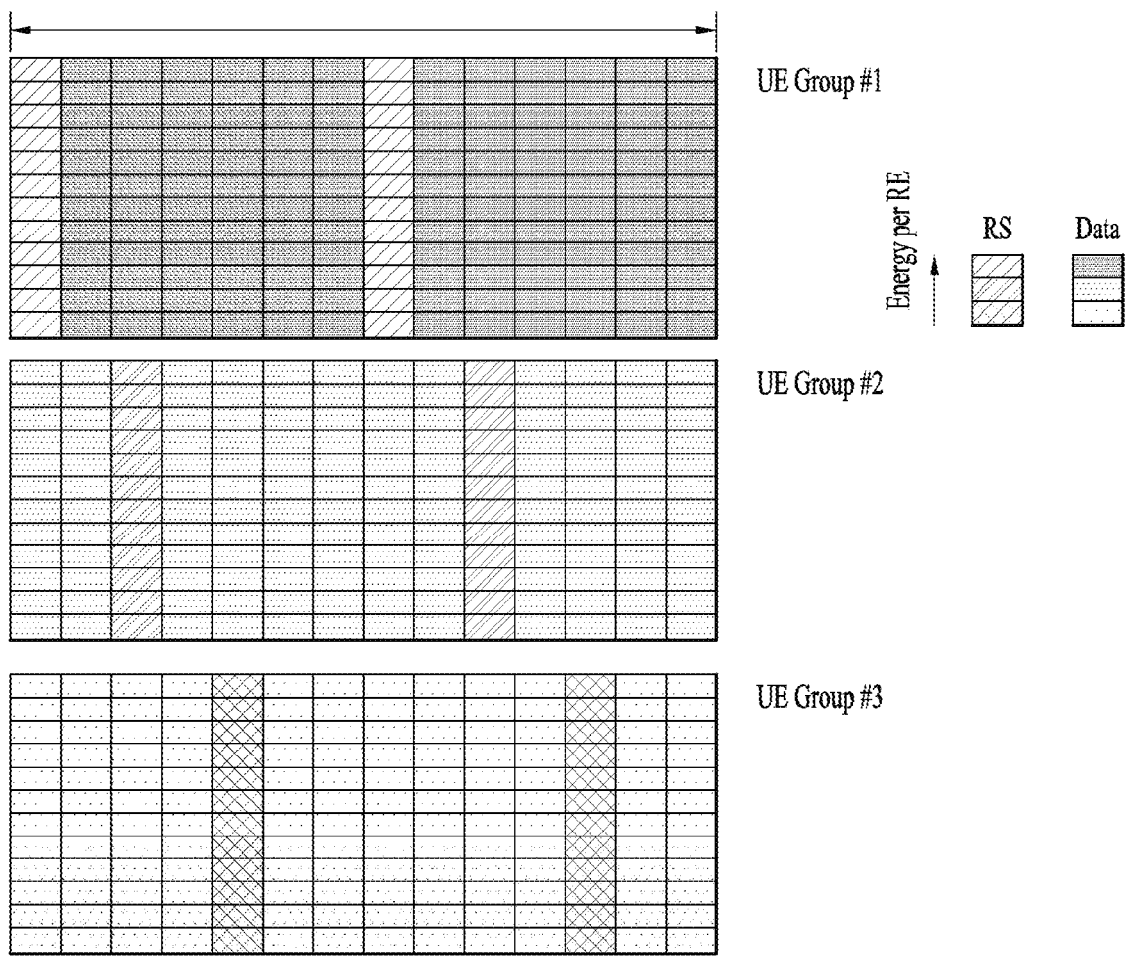
FIG. 10 illustrates a multiple access method according to the present invention.

FIG. 10 illustrates a multiple access method according to the present invention. Particularly, FIG. 10 illustrates an example of a method of multiplexing different UE groups in the same resource while differing in symbols in which RSs of each UE group are positioned and in transmission power of each UE group. While, in FIG. 9, resources used for RS transmission of other UE groups having a high priority or having an early RS time symbol position are emptied without being used for data transmission of a corresponding groups, in FIG. 10, even resources used for RS transmission of other UE groups having a high priority or having an early RS time symbol position are used for data transmission of a corresponding groups. This is because there is a disadvantage of excessively estimating interference for UE2 if UE2 empties a resource used for RS transmission of UE1 without using the resource, as illustrated in FIG. 9.

1) UE Grouping Method

Referring to FIG. 10, different UE groups sharing the same resource may be present. The eNB may designate a specific resource shared by a plurality of UEs and designate a rule of using resources for the UEs. To cause each UE group to use a different RS resource and well support SIC for signals of UEs belonging to different UE groups on UL, each UE group may have different transmission power. In other words, different UE groups may have different priorities and transmission power usable by each group may differ according to priority. For example, a UE group having a high priority may transmit a signal at higher power. The eNB first performs decoding with respect to signals transmitted at high power by UE(s), i.e., signals received at higher power by the eNB, and performs SIC with respect to all received signals using the decoded signals to demodulate a signal received at power of the next level. Referring to FIG. 10, the eNB corresponding to the receiving device searches for a DM-RS position of UE group 1 under the assumption that UE group 1 is present to first decode data of UE group 1.

To support the above method, UEs should be grouped. Simply, UE grouping may be performed based on reference signal received power (RSRP) of a DL RS from the eNB, which differs according to distance from the eNB and channel state. That is, UEs having RSRP of a predetermined level or more may be grouped into one group and UEs having RSRP of the next level may be grouped into another group. For example, UEs corresponding to RSRP≥X1 may belong to UE group #1, UEs corresponding to X2≤RSRP<X1 may belong to UE group #2, and UEs corresponding to X3≤RSRP<X2 may belong to UE group #3.

Each UE group may have a different transmission power offset value. The following table shows different transmission power offset values of UE groups. A DM-RS resource position and/or a DM-RS transmission power offset of each UE group may be known to the UE and the eNB (through signaling or predefinition). If the eNB informs the UE of a UE group index to which the UE belongs, the UE may perform UL transmission using a power offset and a DM-RS resource (e.g., an OFDM/SC-FDM symbol or a DM-RS sequence) according to the UE group index signaled by the eNB. In the following table, a method of transmitting the transmission power of a DM-RS at higher power relative to the transmission power of data is considered in order to raise the performance of channel estimation. In addition, a data transmission power offset of each UE group has a difference of 3 dB according to a UE group.

TABLE 1

|  | Data transmission power offset | DM-RS transmission power offset | DM-RS resource location (symbol number) |
| --- | --- | --- | --- |
| UE group #1 | 6 dB | 9 dB | 0, 7 |
| UE group #2 | 3 dB | 6 dB | 2, 9 |
| UE group #3 | 0 dB | 3 dB | 4, 11 |

Thus, if UEs are grouped according to RSRP of each UE and power of each UE group is set, this means that UL signals transmitted by UEs belonging to the same UE group are set such that received power levels of the eNB are similar. In other words, a UL transmission power value of the UE may differ according to UE grouping. That is, a transmission power value may differ according to an RS resource of a specific UE group.

An RSRP-based power differentiation method of each UE group may be applied from other viewpoints. For example, the following method(s) may be considered.

The amount of resource pools per UE group may differ. For example, more resource pools may be allocated to a UE group having high RSRP and fewer resource pools may be allocated to a UE group having low RSRP.

When UEs transmit the same transport block size, UEs of a higher group may transmit the transport block size using more resources (e.g., RBs).

A combination of DC-NCMA introduced above and the methods proposed in the present invention may be considered. The UE may set power in a symbol in which an RS is transmitted to the highest level and set power in a symbol in which data is transmitted to a relatively low level, wherein data transmission power in symbols in which RSs of other UE groups (e.g., lower UE groups) are transmitted may be set to be lower than that in other symbols in which data is transmitted. That is, the UE may transmit a signal with offset values of RS transmission power and data transmission power according to a UE group to which the UE belongs. To protect a DM-RS of a lower UE group, data transmission power may have different power offset values according to data symbols. The UE may transmit a signal in a symbol in which the DM-RS of the lower UE group is transmitted at lower power than power in other symbols in which data is transmitted. In this case, a plurality of power offset values may be configured for symbols in which data is transmitted. As another method, the UE sets power in a symbol in which an RS is transmitted and power in a symbol in which data is transmitted to be equal, wherein data transmission power in symbols in which RSs of other UE groups (lower UE groups) are transmitted may be set to be lower than data transmission power in other normal symbols and lower than power in an RS transmission symbol. If a modulation order is high, demodulation performance is not good because too much noise is inserted when a channel situation is poor. As a modulation order becomes lower, demodulation performance is good when a channel situation is poor. Considering this, in order to reduce an influence caused by RSs of other UE groups, a method of setting a modulation order applied to data transmission in a symbol in which RSs of other UE groups (lower UE groups) are transmitted to be lower than a modulation order applied to data transmission in other normal symbols may also be additionally considered. For example, if 16-quadrature amplitude modulation (QAM) or 64-QAM is applied to the latter case, quadrature phase shift keying (QPSK) may be applied to the former case.

In an NR system, upon attempting to perform initial access, the UE acquires DL time-frequency synchronization and selects an optimal cell by measuring RSRP for a plurality of cells in a process of selecting a cell for initial access. An RS used for RSRP measurement may be an RS for the purpose of normal radio resource management (RRM). A specific type of UE (e.g., an mMTC UE) may acquire time-frequency synchronization and minimum system information and then use NOMA and/or a contention-based access scheme for data transmission for a specific link. After receiving a report corresponding to RSRP received from the UE or link quality between the eNB and the UE and information such as service applications and requirements of the UE, the eNB may command a specific UE to attempt to perform NOMA-based and/or contention-based UL data access. Such a command is desirably given through RRC signaling. The following information should be signaled to the UE:

A time/frequency resource (e.g., RB indexes and the amount of RBs) on which the UE may attempt to perform contention-based or NOMA-based UL access;

A basic unit of a resource usable by the UE for UL data transmission;

A root index or a seed index used in a DM-RS group and an orthogonal code (e.g., a cyclic shift value) applied to a corresponding UE; and/or An initial power setting value (e.g., a value corresponding to $P_{O\_PUSCH,c}$ which will be described later) that the UE applies on a specific resource.

After receiving such information, the UE may attempt to perform contention-based multiple access (MA) using the information at a desired timing when there is data to be transmitted on UL. To avoid ambiguity, the eNB transmits the information through higher layer signaling and then triggers, through DCI, a specific UE to attempt to perform contention-based MA using a preconfigured resource at a timing desired by the eNB. That is, the eNB may activate or deactivate contention-based UL MA through the DCI.

If contention-based UL MA is activated, a decoding result of a receiving device for UL NOMA and/or contention-based data transmission may be fed back to each UE group. For example, when 4 UEs belongs to UE group 1, {A/N, A/N, A/N, A/N} for UE group 1 may be transmitted as A/N feedback for UL data transmission. Even when 4 UEs belong to UE group 1, the 4 UEs may not always transmit data. The eNB may transmit A/N feedback by setting ACK only for data transmission which is surely ACK and setting NACK and DTX to have the same bit value. Even when the eNB transmits a power control command for the UEs, the eNB may transmit the power control command in units of UE groups. Therefore, feedback or a DL command for a UE group may be CRC-masked using an ID which can be representative of the UE group and then transmitted. In the present invention, since a root index or an initial seed value of a DM-RS sequence used by a specific UE group is representative of a UE group, all or some of the root index and the initial seed value may be used for CRC masking.

In the present invention in which multiple UEs are grouped into one group and a specific UE group uses the same resource, if the eNB configures, for a plurality of UE groups and UEs within a UE group, a DM-RS resource and a shared resource pool and then update occurs, confusion may arise when updated information is different from information pre-received by UE(s). To avoid such confusion, the eNB may signal updated information to UEs through RRC signaling and reactivate, for UEs, a timing at which update is reflected or applied through DCI using IDs of the UEs. To reduce DCI overhead, the eNB may transmit a signal indicating update through DCI using a group ID. If a UE that belongs to a specific group but has not received update information about the specific group receives a signal indicating update through DCI, the UE may be aware that configuration information about the group to which the UE belongs has been updated. However, since the UE has not received the updated configuration information, the UE may transmit a signal indicating that configuration information should be additionally updated to the eNB.

According to the present invention, assuming that an arbitrary k-th UE group transmits a DM-RS in an m-th symbol, a signal that the eNB receives in the m-th symbol is as follows.

$$y(m) = \sum_{g=1, g \neq k}^{G} \sum_{i=1}^{N_g} h_{g,i} \cdot d_{g,i} + \sum_{i=1}^{N_k} h_{k,i} \cdot P_{k,i} + n_m \quad \text{Equation 1}$$

where $N_g$ denotes the number of UEs per UE group, $g=1, 2, \ldots, G$, and G denotes the total number of UE groups. $P_{i,g}$ denotes DM-RS power per UE per UE group, $d_{i,g}$ denotes data power per UE per UE group, $h_{g,i}$ denotes a channel per UE per UE group, $i=1, 2, \ldots, N_g$, $g=1, 2, \ldots, G$, and $n_m$ denotes noise.

When a UE group transmitting a DM-RS at the highest power is k, a receiving device may perform channel estimation by performing auto-correlation for the DM-RS with respect to a symbol in which the DM-RS is transmitted at the highest power. The receiving device may decode data of the UE group within other symbols using $\hat{h}_{k,i}$. After eliminating interference for data of a UE group which has first been decoded from all received signals, the receiving device performs data decoding of the next UE group.

2) Power Control

A UL power control method of a 3GPP LTE system will be described below with reference to the 3GPP TS 36.213 document. If the UE transmits a PUSCH without simultaneous PUCCH for a serving cell c, then UE transmission power $P_{PUSCH,c}(i)$ for PUSCH transmission in a subframe i is given by the following equation.

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} \quad \text{Equation 2}$$

The unit of the UE transmission power $P_{PUSCH,c}(i)$ in Equation 2 is dBm. Herein, $P_{CMAX,c}(i)$ is configured UE transmission power for serving cell c in the subframe i, defined in the 3GPP TS 36.101 document. $M_{PUSCH,c}(i)$ is the bandwidth of PUSCH resource assignment, expressed in the number of RBs valid for the subframe i and the serving cell c. If the UE is configured with a higher layer (e.g., RRC) parameter UplinkPowerControlDedicated-v12x0 for the serving cell c (see 3GPP TS 36.331) and the subframe i belongs to a UL control subframe set 2 as indicated by a higher layer parameter tpc-SubframeSet-r12 (see 3GPP TS 36.331), then for j=0 or 1, $\alpha_c(j)=\alpha_{c,2} \in \{0, 0.4, 0.5, 0.6, 0.7, 0.8, 0.9, 1\}$. In this case, $\alpha_{c,2}$ is a parameter alpha-SubframeSet2-r12 provided by higher layers for each serving cell c (see 3GPP TS 36.331). In addition, for j=2, $\alpha_c(j)=1$. Otherwise, for j=0 or 1, $\alpha_c \in \{0, 0.4, 0.5, 0.6, 0.7, 0.8, 0.9, 1\}$ is a 3-bit parameter provided by higher layers for the serving cell c and, for j=2, $\alpha_c(j)=1$. $PL_c$ is a DL path loss estimate calculated in the UE for the serving cell c in dB and $PL_c$=referenceSignalPower−higher layer filtered RSRP. Herein, referenceSignalPower is provided by higher layers (see 3GPP TS 36.331) and RSRP is defined in the 3GPP TS 36.213 document for a reference serving cell. Higher layer filter configuration is defined in 3GPP TS 36.331 document for the reference serving cell. For Ks=1.25, $_{TF,c}(i)=10 \log_{10}\{(2^{BPRE*Ks}-1)*\beta PUSCH_{offset}\}$ and, for Ks=0, $_{TF,c}(i)=0$, wherein Ks is given by a parameter deltaMCS-Enabled provided by higher layers for the serving cell c (see 3GPP TS 36.331). Ks=0 for transmission mode 2. BPRE and $\beta^{PUSCH}_{offset}$ are computed for each serving cell c according to a specific rule (see 3GPP TS 213).

In the LTE system, UL power control may be represented by Equation 2. For example, power during UL data transmission is determined by the amount of resources used for PUSCH transmission, an MCS, path loss of a corresponding UE, and a power control command indicated on DL. By multiplying a specific constant α (alpha) by path loss, an effect of partially compensating path loss (the case of alpha <1) may be obtained.

In the present invention, if power setting of each UE group differs, i.e., if a power offset is present between UE groups, this means that the value of $P_{O\_PUSCH,c}(j)$ in Equation 2 differs according to a UE group. For example, $P_{O\_PUSCH,c}(j)$ of UEs belonging to group 1 may have an offset of 6 dB and $P_{O\_PUSCH,c}(j)$ of UEs belonging to group 2 may have an offset of 3 dB. Such an offset value is a transmission power value applied to initial transmission for specific data when UEs belonging to a corresponding group transmit data on UL. Component(s) of $P_{O\_PUSCH,c}(j)$ are provided through higher layer signaling.

3) Layering of Resource Use Per UE Group

As mentioned above, UEs may be grouped and different resources may be used for respective UE groups. A plurality of resource groups may be present and resources within each resource group may be allocated to UE(s) belonging to a corresponding UE group. Orthogonality between a plurality of resource groups and orthogonality between resources within one resource group may differ. UEs that may be multiplexed in one resource group may share similar characteristics (e.g., similar channels, path loss, RSRP, etc.).

In the present invention, a plurality of UE groups may be present and resources for each UE group may be allocated, wherein (quasi-)orthogonal resources are allocated to UE groups and orthogonal resources are allocated to UEs within a UE group.

In the present invention, a resource group capable of multiplexing UEs may be especially specified as a DM-RS resource group and the DM-RS resource group may be directly mapped to a UE group. For example, a plurality of DM-RS resource groups may be present and DM-RS resources within each DM-RS resource group may be distinguished by orthogonal sequences obtained by applying different cyclic shifts while using the same root index or may correspond to the orthogonal sequences. Different DM-RS resource groups may use quasi-orthogonal DM-RS resources. For example, different DM-RS resource groups, i.e., UE groups, may be distinguished by using different root indexes and, in the case of a gold sequence, may be distinguished by using gold sequences having different initial seed values.

As another modification of the present invention, DM-RSs of different UE groups may be transmitted in the same symbol/time duration without performing time division multiplexing (TDM) for the DM-RSs of different UE groups and may be code-division-multiplexed (CDMed). In this case, if orthogonality of some degree can be assigned to DM-RSs of different UE groups, this may obtain better performance than overlap between a DM-RS and data and raise the efficiency of resources as compared with nulling a DM-RS of a specific UE group by a UE of another UE group, i.e., DC-NCMA. This method serves to group UEs, allocate orthogonal DM-RS resources to UEs of one UE group, and allocate quasi-orthogonal resources to UE groups.

As another modification of the present invention, one UE may be included in a plurality of UE groups. When one UE is included in a plurality of UE groups, the UE may have a plurality of DM-RS resources. Particularly, a UE having a good channel state in the center of a cell may be included different UE groups having different transmission power and may selectively use a resource, for example, a DM-RS resource, (arbitrarily). Since a DM-RS resource may differ according to a UE group, if a UE is included in a plurality of UE groups, this may imply that the UE may use a plurality of DM-RS resource groups.

When a UE is included in a plurality of UE group, the UE may use a plurality of resources using broadly two methods described below. In the first method, in association with power control described previously, the UE should have a different initial transmission power value per resource and subsequent power control is performed with respect to each UE group, i.e., each resource group. A UE included in a plurality of UE groups includes as many power control chains as the number of UE groups to which the UE belongs. In the second method, when one UE is included in a plurality of UE groups, the UE may divide resources that can be used by the UE into a primary group and a secondary group. In this case, the UE uses a power value designated for the primary group as initial transmission power. That is, power control of the UE is performed based on the primary group and transmission power in a resource corresponding to the secondary group is also determined based on the primary group. When one UE is included in a plurality of UE groups, the UE may use a plurality of quasi-orthogonal DM-RS resources. In using the plural quasi-orthogonal DM-RS resources, a resource group which is reference for determining the transmission power of the UE, for example, a DM-RS resource group, may be referred to as a primary resource. Although the UE transmits signals using a plurality of DM-RS resource groups, the number of power control chains of the UE may be one or may be smaller than the number of resource groups to which the UE belongs.

When one UE belongs to a plurality of different DM-RS resource groups and transmission power of each DM-RS resource group differs, the UE may use a different resource according to initial transmission and subsequent retransmission. If the eNB has successfully decoded UL data transmitted by the UE, the eNB may transmit an ACK signal indicating that the UL data has been successfully received. For data for which ACK is not received, the UE may attempt to perform retransmission. Retransmission is performed to improve decoding performance of a receiving device with respect to already transmitted initial data. It is difficult to expect that the receiving device will be able to always combine retransmission data and initial transmission data. If a first trial is performed with respect to initially transmitted data, then a second trial, a third trial, and the like may be performed with respect to subsequently retransmitted data. When a plurality of different UE groups is allocated to the UE, if the UE performs the first trial in a primary UE group or an arbitrary UE group and does not receive ACK for the first trial, the UE may move to another UE group and then perform the second trial. Since transmission power and an interference environment differ according to each UE group, it may be expected that the eNB will successfully receive transmitted data after the first trial.

In the present invention described above, UE multiplexing and data transmission may be performed based on contention of grant-free transmission. Grant-free transmission refers to a scheme in which the UE autonomously transmits data under no dynamic control from the eNB when data that should be transmitted by the UE is generated within a specific time/frequency resource. In other words, in grant-free transmission, a resource used for transmission is preconfigured or predetermined and a transmitting device attempts to perform transmission if there is data to be transmitted thereby within the resource. According to the grant-free transmission scheme, direct scheduling by the eNB is not involved and thus contention between different UEs is inevitably generated. In the present invention, grant-free is used as the term indicating grant-free/autonomous/contention-based transmission scheme. A representative system of the contention-based MA scheme may be, for example, a Wi-Fi system. A scheme of applying carrier sensing and random backoff in a state in which contention-based transmission is performed may be included in the grant-free transmission scheme. The present invention may be used for a grant-based MA scheme as well as a contention-based scheme. The eNB or the network may preconfigure a shared resource for the UE or specify a time-frequency resource that should be used at a scheduling timing through, for example, a UL grant. The eNB or the network may inform the UE of root index and cyclic shift information of a DM-RS that should be used in the time-frequency resource as a scheduling grant. To this end, the eNB preforms the UE of information about a plurality of DM-RS resource groups (e.g., a root index or an initial seed value) and cyclic shift information within each DM-RS resource group through higher layer signaling (e.g., RRC signaling) and accurately indicates DM-RS information that the UE should use by a combination of such information through DCI.

The present invention may be implemented in a combined form of the grant-based scheduling scheme and the contention-based MA scheme. The present invention may preallocate a plurality of DM-RS resource groups and cyclic shift information within each DM-RS resource group to the UE and cause the UE to attempt to perform contention-based MA. In this case, the UE may configure a specific UE group as a primary group or may be included in only one UE group. If the eNB continues to fail to decode data transmitted by the UE or determines that data transmission to the UE is not present within an expected time duration, the eNB may allocate another DM-RS resource group and/or another cyclic shift to the UE and request that the UE perform UL transmission by transmitting a UL grant through the DCI.

4) Interference Measurement Method (DM-IM Configuration)

DC-NCMA described above may compensate disadvantages of the present invention according to methods of the present invention. To group UEs and avoid interference affecting a DM-RS of a UE group from another UE group, DC-NCMA causes UEs of a lower UE groups not to transmit data at a DM-RS symbol position of a higher UE group. Thus, DC-NCMA has a purpose of protecting a DM-RS of a higher UE group. In this case, although DC-NCMA protects the DM-RS, DC-NCMA may not fulfill a purpose of causing the receiving device to perform more accurate channel estimation using the DM-RS. For example, based on UE1 of FIG. 9, the DM-RS of UE1 is surely protected from interference so that the eNB is not problematic in receiving the DM-RS of UE1. However, since interference of other UEs is prevented in a corresponding DM-RS symbol, channel overestimation using the DM-RS may be performed and it may be difficult to accurately obtain an interference covariance because there is no interference. Then, it is difficult to apply minimum mean-square-error-interference rejection combining (MMSE-IRC). Hence, to solve these problems, the eNB or network may designate a separate demodulation interference measurement (DM-IM) resource per UE or per UE group. Interference may be properly measured using the DM-IM resource.

Hereinafter, an interference measurement method using DM-IM and a DM-IM configuration method are proposed. The following proposal is not limited to DC-NCMA and may be generally applied to the above-described UE grouping method and the above-described method of applying DM-RS resource differentiation per UE group. Since interference and a power level may differ according to each UE group, a position of DM-IM may differ according to each UE group. The position of DM-IM may be configured per UE group and may be determined according to a symbol position of a DM-RS that a corresponding UE group uses. If the UE desires to perform UL MA by a DC-NCMA scheme, the position of DM-IM that the UE should empty so that the receiving device may measure interference of a channel of the UE may be determined by the position of a DM-RS symbol that the UE selects. In other words, the position of DM-IM is determined by the position of a symbol in which the UE transmits a DM-RS during UL transmission and a sequence of the DM-RS (e.g., a root index, an initial seed, etc.) and the UE transmits data by nulling the corresponding symbol.

Even for interference measurement for a plurality of UEs multiplexed within the same UE group, DM-IM may be configured. The position of a DM-IM symbol may be determined by the position of a DM-RS symbol or a DM-RS sequence. However, since nulling all DM-IM symbols for DM-IM lowers the efficiency of resources, it is desirable to null a specific frequency or RE for DM-IM. Therefore, a frequency position of a DM-IM resource may differ according to each UE within a specific UE group and a frequency position or an RE in which the DM-IM resource can be located may be determined by a DM-RS sequence used by the UE within the same symbol in which the DM-IM resource is located, for example, a cyclic shift of the DM-RS sequence. The UE may has DM-IM for inter-group interference measurement and DM-IM for intra-group interference measurement. DM-IM for inter-group interference measurement should be a resource that all UEs within the same UE group null for transmission. DM-IM for intra-group interference measurement may be defined in a different frequency region per UE within a (time) symbol determined by a DM-RS resource (e.g., a symbol position, a sequence, etc.) of a corresponding UE group.

Such a DM-IM configuration method is not applied only to DC-NCMA and may be used for various modifications of the methods proposed in the present invention.

5) UE Multiplexing Method within UE Group

As a UE multiplexing method within a UE group, CDM/FDM may be considered. In FDM, it is important not to overlap frequency resources used by UEs within the same UE group. This is because multiplexing capacity of UEs is limited by the number of reception antennas of the eNB if a plurality of UEs uses the same resource. Therefore, when UEs are multiplexed by the FDM scheme, the present invention facilitates data decoding of the eNB in a collision situation by overlapping only a part of frequency resources used even when different UEs are entered at the same timing rather than fully overlapping resources used by UEs.

Figure 11:
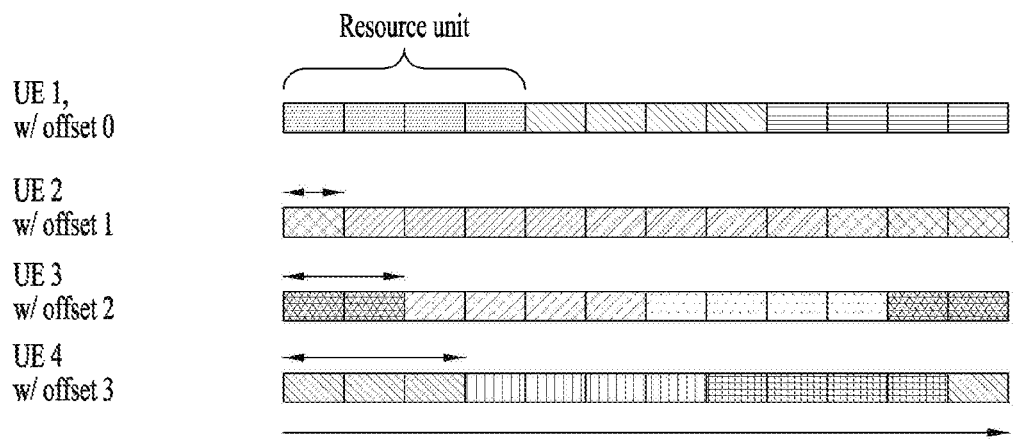
FIG. 11 illustrates frequency division multiplexing (FDM) using a resource element offset according to the present invention.

FIG. 11 illustrates FDM using an RE offset according to the present invention. Particularly, FIG. 11 illustrates a method of overlapping only partial frequencies even when a plurality of UEs is multiplexed by FDM by separately configuring an RE offset per UE. When one UE transmits data in a shared resource, although the amount of usable resources may differ according to the amount of data that desires to be transmitted, a basic resource unit used for transmission may be equally maintained between the multiplexed UEs. A resource unit used by UEs multiplexed in a shared resource may be set to be equal and the amount of resources used by the UE may vary according to the amount of data of the UE.

As another scheme, a different pattern may be defined for REs used between UEs and a pattern for RE use may be allocated to the UE as an additional code. A code used by the UE may be changed by a function of a transmission timing (e.g., a subframe, a slot, or a symbol number). This means that the position of an RE occupied by the UE for actual data transmission may vary at every transmission timing.

As another scheme, CDM between UEs may be considered.

Figure 12:
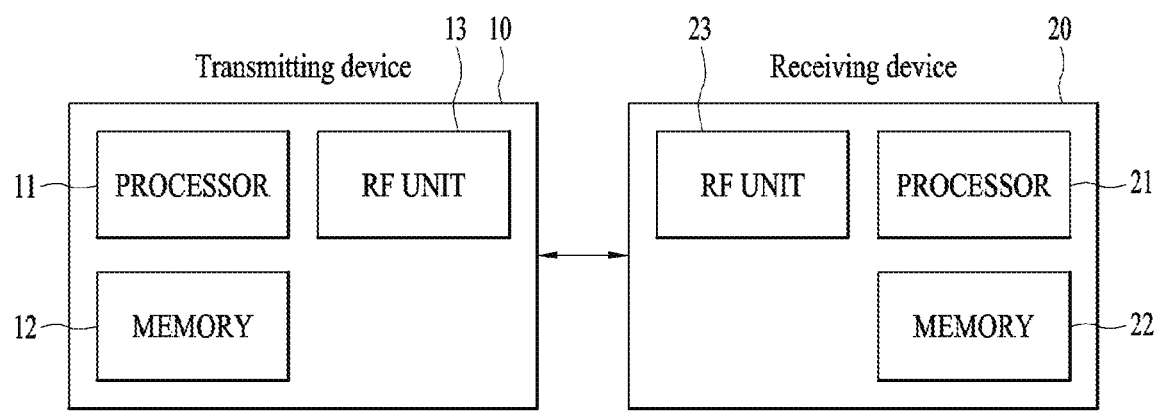
FIG. 12 is a block diagram illustrating elements of a transmitting device 10 and a receiving device 20 for implementing the present invention.

FIG. 12 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described examples of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the examples of the present invention, a UE operates as the transmitting device 10 in UL and as the receiving device 20 in DL. In the examples of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor may group UEs into one or more UE groups according to a proposal of the present invention. The eNB processor may group UEs based on channel information (e.g., RSRP) reported by the UEs. The eNB processor may control the eNB RF unit to transmit information about UE groups. The eNB processor may control the eNB RF unit to transmit information about a UL DM-RS resource of each UE group. The DM-RS resource may differ in a time slot and/or a frequency resource occupied in a slot according to a UE group. The eNB processor may configure a different power offset value per UE group and control the eNB RF unit to signal the configured power offset value. The eNB processor may configure a time-frequency resource in which UEs are capable of attempting to perform UL transmission, without UL grant or based on contention and control the eNB RF unit to transmit information about the time-frequency resource. The eNB processor may monitor UL data of one or more UEs in the time-frequency resource. The eNB processor may restore UL data using a DM-RS received in the DM-RS resource of each UE group from signals received in the same time-frequency resource according to a proposal of the present invention.

The UE processor may control the UE RF unit to receive the information about UE groups. The UE processor may control the UE RF unit to transmit UL data and a DM-RS for demodulating the UL data according to a UE group to which the UE belongs. The UE processor may control the UE RF unit to receive the information about the UL DM-RS resource of each UE group. The DM-RS resource may differ in a time slot and/or a frequency resource occupied in a slot according to a UE group. The UE processor may control the UE RF unit to receive a power offset value to be used for initial transmission of the UL data. The UE processor may determine transmission power of the UL data using the power offset value. The UE processor may control the UE RF unit to transmit the UL data using the determined transmission power. The UE processor may control the UE RF unit to receive the information about the time-frequency resource in which UEs are capable of attempting to perform UL transmission, without a UL grant or based on contention. Upon occurrence of UL data to be transmitted, the UE processor may control the UE RF unit to transmit the UL data within the time-frequency resource. The UE processor may control the UE RF unit to transmit a DM-RS using a DM-RS resource corresponding to a UE group to which the UE belongs among DM-RS resources within the time-frequency resource.

As described above, the detailed description of the preferred examples of the present invention has been given to enable those skilled in the art to implement and practice the invention. Although the invention has been described with reference to exemplary examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The examples of the present invention are applicable to a base station, a user equipment, or other devices in a wireless communication system.

What is claimed is:

1. A method of transmitting an uplink (UL) signal by a user equipment (UE) in a wireless communication system, the method comprising:
    receiving UE group information on a first UE group to which the UE belongs; and
    transmitting UL data and a demodulation reference signal (DM-RS) for demodulating the UL data based on the UE group information,
    wherein the DM-RS is transmitted based on a first UL DM-RS resource related to the first UE group to which the UE belongs among a plurality of UL DM-RS resources respectively related to one or more UE groups,
    wherein transmission power used for each of the one or more UE groups is differently configured based on priority of the each of the one or more UE groups,
    wherein a power offset used for the each of the one or more UE groups is differently configured for the each of the one or more UE groups,
    and wherein a first transmission power used for the UL data is determined based on a first power offset configured to the first UE group to which the UE belongs.

2. The method of claim 1, further comprising:
    receiving sharing resource information on a time-frequency resource in which the UE is capable of attempting to perform UL access,
    wherein the UL data and the DM-RS are transmitted within the time-frequency resource.

3. The method of claim 1,
    wherein the plurality of UL DM-RS resources are distinguished by different time symbols within a slot.

4. A user equipment (UE) for transmitting an uplink (UL) signal in a wireless communication system, the UE comprising,
    a radio frequency (RF) unit, and
    a processor configured to control the RF unit, the processor configured to:
    control the RF unit to receive UE group information on a first UE group to which the UE belongs; and
    control the RF unit to transmit UL data and a demodulation reference signal (DM-RS) for demodulating the UL data based on the UE group information, and
    wherein the processor is configured to control the RF unit to transmit the DM-RS based on a first UL DM RS resource related to the first UE group to which the UE belongs among a plurality of UL DM-RS resources respectively related to one or more UE groups,
    wherein transmission power used for each of the one or more UE groups is differently configured based on priority of the each of the one or more UE groups,
    wherein a power offset used for the each of the one or more UE groups is differently configured for the each of the one or more UE groups,
    and wherein a first transmission power used for the UL data is determined based on a first power offset configured to the first UE group to which the UE belongs.

5. The UE of claim 4,
    wherein the processor is configured to:
    control the RF unit to receive sharing resource information on a time-frequency resource in which the UE is capable of attempting to perform UL access, and
    control the RF unit to transmit the UL data and the DM-RS within the time-frequency resource.

6. The UE of claim 4,
    wherein the plurality of UL DM-RS resources are distinguished by different time symbols within a slot.

7. A method of receiving an uplink (UL) signal from a user equipment (UE) by a base station (BS) in a wireless communication system, the method comprising:
    transmitting UE group information on a first UE group to which the UE belongs; and
    receiving UL data and a demodulation reference signal (DM-RS) for demodulating the UL data based on the UE group information,
    wherein the DM-RS is received based on a first UL DM-RS resource related to the first UE group to which the UE belongs among a plurality of UL DM-RS resources respectively related to one or more UE groups,
    wherein transmission power used for each of the one or more UE groups is differently configured based on priority of the each of the one or more UE groups,
    wherein a power offset used for the each of the one or more UE groups is differently configured for the each of the one or more UE groups,
    and wherein a first transmission power used for the UL data is determined based on a first power offset configured to the first UE group to which the UE belongs.

* * * * *